United States Patent
Kakamu et al.

(10) Patent No.: US 6,688,823 B2
(45) Date of Patent: Feb. 10, 2004

(54) FASTENING POSITION ADJUSTABLE BOLT AND MOUNT CONSTRUCTION OF MEMBERS USING THE SAME

(75) Inventors: Hideki Kakamu, Aichi (JP); Shuji Ito, Aichi (JP); Ryuji Utsuno, Aichi (JP); Masahito Yabuoshi, Chiryu (JP)

(73) Assignee: Aoyama Seisakusho Co., Ltd., Nagoya (JP)

(*) Notice: Subject to any disclaimer, the term of this patent is extended or adjusted under 35 U.S.C. 154(b) by 0 days.

(21) Appl. No.: 09/958,497
(22) PCT Filed: Feb. 2, 2001
(86) PCT No.: PCT/JP01/00740
§ 371 (c)(1), (2), (4) Date: Oct. 10, 2001
(87) PCT Pub. No.: WO01/59310
PCT Pub. Date: Aug. 16, 2001

(65) Prior Publication Data
US 2003/0071477 A1 Apr. 17, 2003

(30) Foreign Application Priority Data
Feb. 14, 2000 (JP) .......................... 2000-34527

(51) Int. Cl.$^7$ ................................................ F16B 39/00
(52) U.S. Cl. ........................... 411/107; 411/5; 411/352; 411/999
(58) Field of Search ...................... 296/70, 72, 203.02; 411/1–5, 8, 999, 107, 352, 353

(56) References Cited

U.S. PATENT DOCUMENTS

| | | | | |
|---|---|---|---|---|
| 2,761,484 | A | * | 9/1956 | Sternick |
| 3,770,036 | A | * | 11/1973 | Sherman |
| 4,068,555 | A | * | 1/1978 | Volkman |
| 5,807,052 | A | * | 9/1998 | Van Boven |

FOREIGN PATENT DOCUMENTS

| | | |
|---|---|---|
| EP | 0 373 049 A1 | 6/1990 |
| EP | 0 534 001 A1 | 3/1993 |

* cited by examiner

*Primary Examiner*—Flemming Saether
(74) *Attorney, Agent, or Firm*—Frishauf, Holtz, Goodman & Chick, P.C.

(57) ABSTRACT

A fastening position adjustable bolt is provided which includes a bolt body and a cylindrically shaped collar bolt. The bolt body has a head, a shank, and first male threads formed on a lower outer peripheral surface of the shank, and the collar bolt has second male threads formed on an upper outer peripheral surface thereof. An engaging portion engages the shank of the bolt body with the collar bolt. The engaging portion is disposed between the head of the bolt body and a position on the shank at which the first male threads are formed, and the engaging portion is adapted to release engagement between the collar bolt and the shank of the bolt body upon application of a torque having at least a predetermined value.

12 Claims, 8 Drawing Sheets

$\alpha, \beta$: FLANK ANGLE ($\alpha<\beta$)

FASTENING POSITION ADJUSTABLE BOLT AND MOUNT CONSTRUCTION OF
MEMBERS USING THE SAME

This application is a U.S. National Phase Application under 35 USC 371 of International Application PCT/JP01/00740 (published in English) filed Feb. 2, 2001.

TECHNICAL FIELD

The invention relates to a bolt capable of fastening members disposed with a spacing therebetween while absorbing dispersion such as spacing, dislocation of center or the like, and to a mount construction for the members with the use of the bolt.

BACKGROUND ART

For example, in the case where both ends of a lengthy member called an instrument panel reinforcement 52 (referred below to as "reinforcement") are to be bolted to an end surface of a motor car body 51, dispersion in accuracy of press work and assembly of the car body 51 and the reinforcement 52 results in that bolt mount positions as well as the car body 51 and the reinforcement 52 give rise to dispersion. Conventionally, bolting on the car body 51 is performed by providing an adjustment member 53, which is L-shaped in horizontal cross section, on one side of the reinforcement 52 and making use of slots 54 of the adjustment member 53 to adjust relative positions of the adjustment member 53 and the reinforcement 52. However, the use of such adjustment member 53 causes problems that the number of parts is increased as compared with the case of direct bolting of the reinforcement 52 and the number of bolts being fastened is increased leading to an increase in man-hour in the fastening operation.

DISCLOSURE OF INVENTION

The invention is devised to solve the above-mentioned problems of the prior art and to provide a bolt capable of surely and easily fastening members, between which is a spacing involving dispersion in dimensional accuracy, without the use of any adjustment member, while absorbing such dispersion, and a mount construction for members with the use of the bolt.

The bolt of the invention devised to solve the above-mentioned problems has a feature in comprising a cylindrical-shaped collar bolt formed at an upper portion of an outer peripheral edge thereof with male threads, and a bolt body formed at a lower portion of an outer peripheral surface thereof with male threads and having a head at an upper portion thereof, the collar bolt being mounted on a shank of the bolt body between a portion, where the male threads are formed, and the head so that engagement between the collar bolt and the bolt body is released upon application of torque having a predetermined value or more.

BEST MODE FOR CARRYING OUT THE INVENTION

The invention will be described below in details with reference to the drawings.

Figure 1:
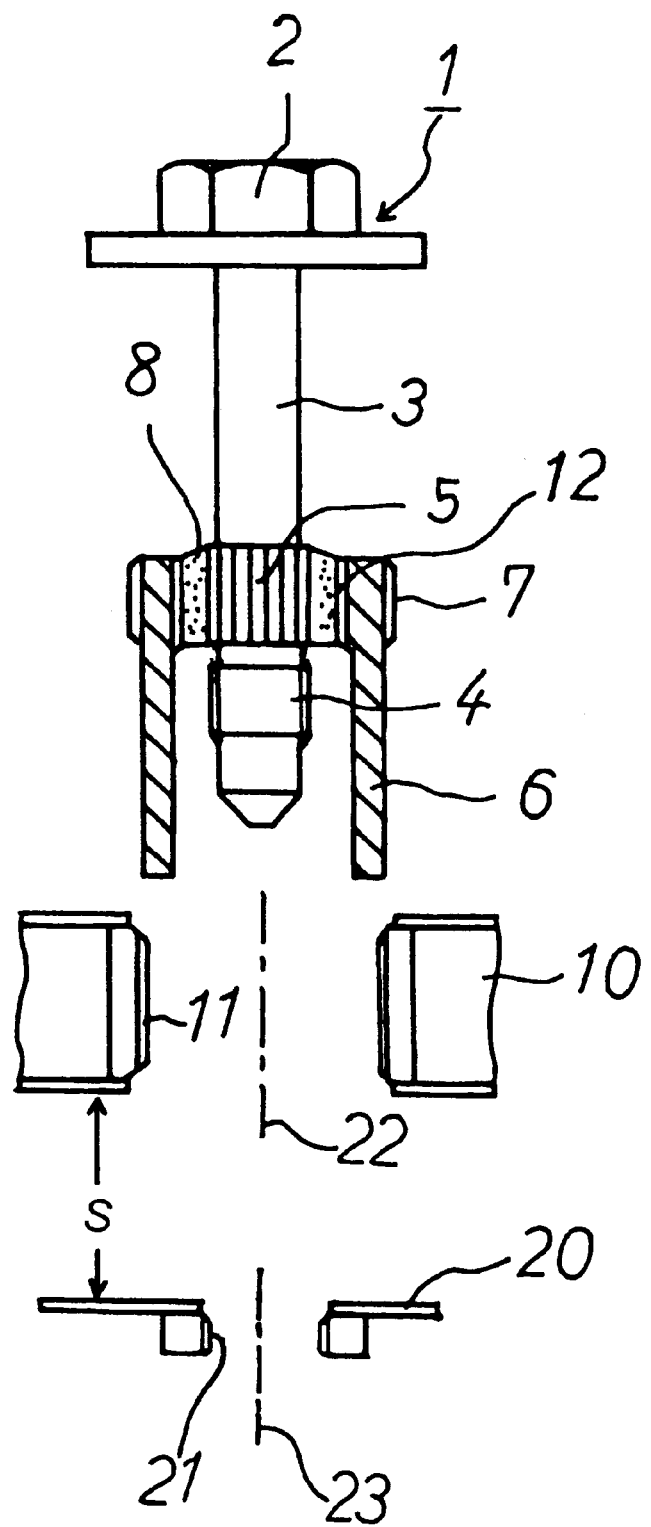
FIG. 1 is a partial cross sectional view showing an embodiment of a bolt of the invention.

In FIG. 1, the reference numeral 1 designates a bolt body (generally formed of a metal such as carbon steel, alloy steel, stainless steel, aluminum or the like) provided with a flanged head 2, and having a shank 3 formed at its tip end with male threads 4. The male threads 4 can be threaded into female threads 21 formed on a second member 20, which is one of members being fastened. Also, serrations 5 are formed between the male threads 4 on the shank 3 and the head 2 (a position of the serrations may be suitably determined depending upon a spacing S between a first member 10, which is the other of the members being fastened, and the second member 20 in a manner described later). In addition, a collar portion 13 (generally formed of the same material as that of the bolt body, and may be provided integral with the shank 3 or a collar formed separately may be arranged at a predetermined position on the shank by means of a known method such as shrinkage fit or the like) may be provided in place of the serrations 5.

The reference numeral 6 designates a cylindrical-shaped collar bolt (generally formed of the same material as that of the bolt body), an upper portion of an outer peripheral surface of which is formed with male threads 7 capable of threading into female threads 11 formed on the first member 10. The collar bolt 6 is mounted on a resin portion 8 provided on the serrations 5 of the bolt body 1 (see FIG. 1) or a collar portion 13 (see FIG. 2), through a lead portion 12 (generally formed of the same material as that of the bolt body). This mounting is such that torque applied to the bolt body can be transmitted to the collar bolt until it reaches a predetermined value, while engagement between the collar bolt 6 and the bolt body 1 is released when the torque exceeds the predetermined value.

Figure 2:
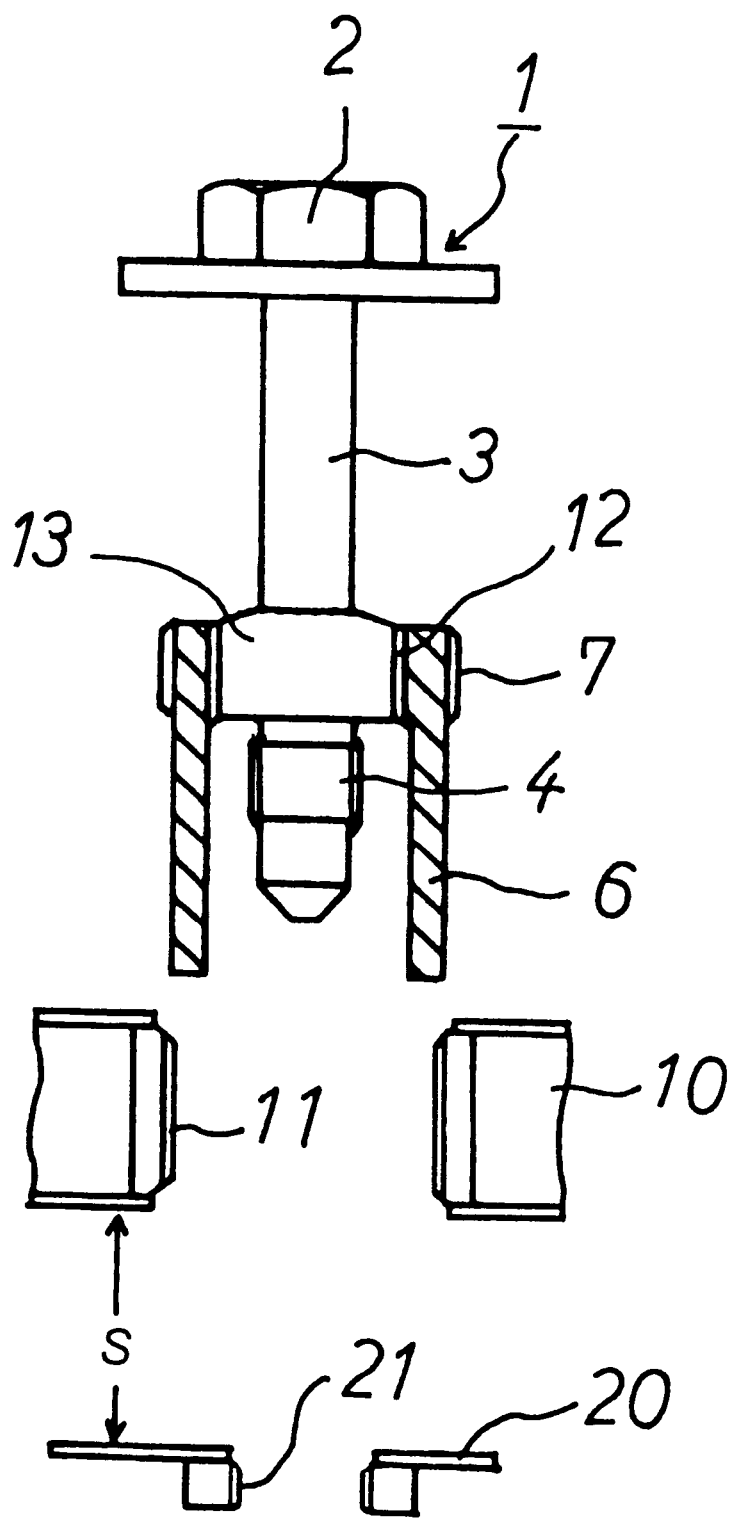
FIG. 2 is a partial cross sectional view showing another embodiment of a bolt of the invention.
Figure 3:
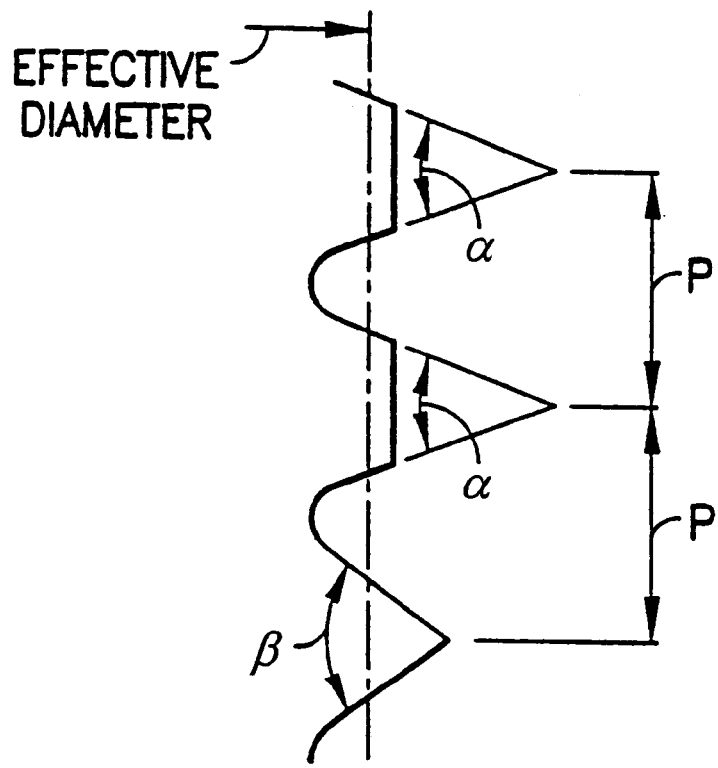
FIG. 3 is a partially enlarged cross sectional view showing an engaging relationship between a resin portion or a collar portion and a lead portion by citing a shape of thread ridges applied some work thereto.
Figure 4:
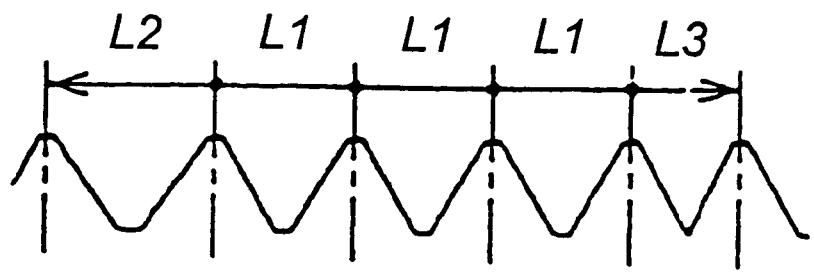
FIG. 4 is a partially enlarged cross sectional view showing another engaging relationship between a resin portion or a collar portion and a lead portion by citing a shape of thread ridges applied some work thereto.

Concretely, the above is owing to formation of the resin portion 8 (formed of a synthetic resin such as polypropylene, polyamide 66, polyacetal or the like) between the lead portion 12 and the serrations 5 by means of insert molding (an example in FIG. 1), that is, surface contact between the inner peripheral surface of the lead portion and the resin portion (correctly, adhesion of the resin and an inner peripheral surface of the lead portion), or to engagement between female threads formed on the inner peripheral surface of the lead portion and male threads formed on an outer peripheral surface of the collar portion 13 (an example in FIG. 2). Here, some work is applied on thread ridges of either of the female threads on the lead portion and the male threads on the collar portion (ordinarily, thread ridges of the male threads taking account of easiness of work), that is, tops of a part of the thread ridges are collapsed in a diameter reducing direction as shown in FIG. 3 (for example, a range of collapse is one-third in a circumferential direction, and three thread ridges in an axial direction), or a part of threads is increased or decreased in pitch as shown in FIG. 4 (L2>L1>L3, for example, a range of change is about ±20% of L1 in terms of pitch, and one thread ridge for pitch in + direction and in − direction, respectively). Consequently, engagement between portions, to which such work is applied, becomes close as compared with engagement between normal thread ridges, so that a threshold value of torque (torque value for releasing the engagement), which is applied to the bolt body, transmitted to the collar bolt will increase.

However, the configuration of engagement between the collar bolt and the bolt body is not limited to the above example, and other suitable configurations can be employed, for example, a configuration, in which the resin portion 8 is provided and female threads or serrations are formed on the lead portion 12 (as mentioned the above, said resin portion is generally formed by means of insert molding, so that male threads or serrations corresponding to the female threads or serrations formed on the lead portion are formed on the outer peripheral surface of the resin portion. In this connection, as a contact area between the outer peripheral surface of the resin portion and the inner peripheral surface of the lead portion increases, the threshold value of torque, which is applied to the bolt body, transmitted to the collar bolt is expected to increase), or a configuration, in which male threads are separately formed on the outer peripheral surface of the resin portion 8 mounted to the bolt body 1 and female threads applied by the above work are formed on the lead portion 12, or a configuration, in which the collar bolt 6 is press fitted into a portion formed the serrations 5 of the bolt body 1 (in this case, a portion corresponding to the resin portion 8 and the lead portion 12 shown in FIG. 1 (in other words, a portion corresponding to an upper surface of the cylindrical-shaped collar bolt) is beforehand formed as a member (it is desired to imagine a member, for example, a lid mounted to the upper surface of the collar bolt by means of a known method such as welding in a roof-shaped manner) preferably united with the collar bolt. In addition, press fit is carried out in such a manner that the bolt body is fitted into a hole having a somewhat smaller diameter than that of serrations and formed centrally of the united member to provide close contact between the serrations and the hole). Then an explanation will be given to an action of the bolt of the invention with the bolt of the first embodiment as an example (see FIGS. 5 to 8). In this connection, the first member 10 corresponds to a car body and the second member 20 corresponds to a member such as a reinforcement in these figures. Also, a spacing S between the first member 10 and the second member 20 involves dispersion, and relative positions of a central axis 22 of threads 11 (female threads) on the first member 10 and a central axis 23 of threads 21 (female threads) on the second member 20 also involve dispersion.

Figure 5:
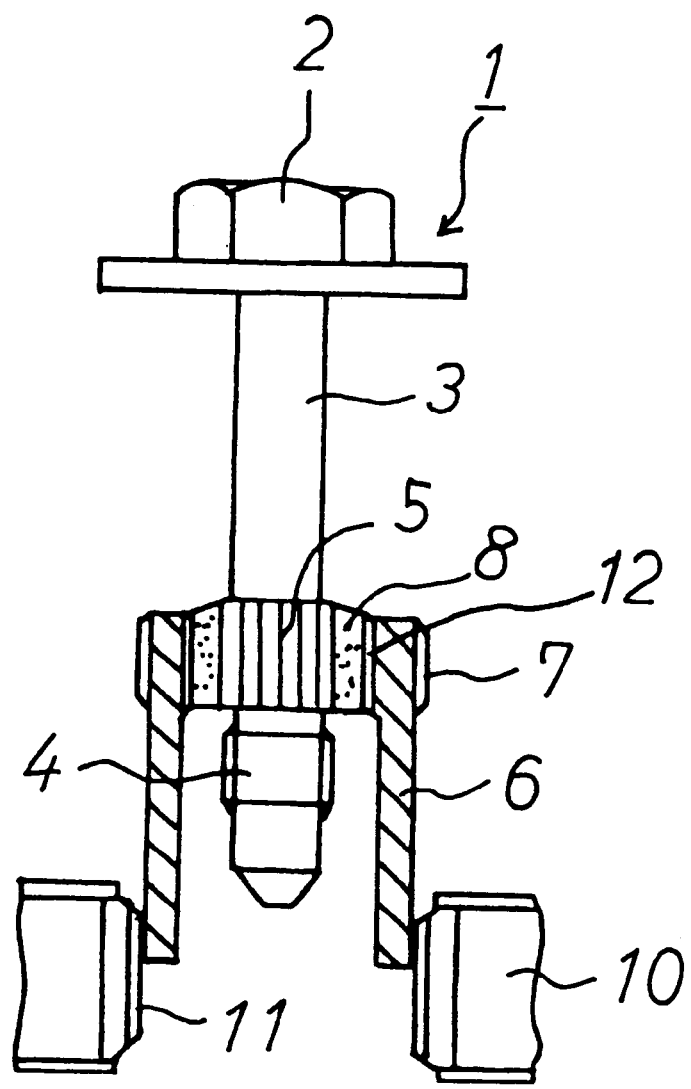
FIGS. 5 to 8 are partial cross sectional views showing a state of use of a bolt shown in FIG. 1 as the fastening operation proceeds (here, FIG. 5 showing a state, in which a collar bolt is inserted into a first member, FIG. 6 showing a state, in which a lower end of the collar bolt abuts against an upper surface of a second member, FIG. 7 showing a state, in which a bolt body separates from the collar bolt, and FIG. 8 showing a state, in which the bolt body is threaded into the second member).
Figure 5:
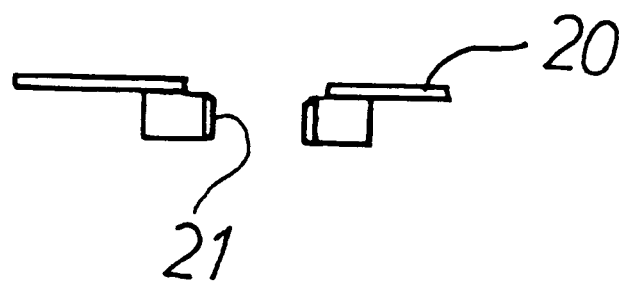

First, as shown in FIG. 5, the collar bolt 6 mounted on the serrations 5 of the bolt body 1 through the resin portion 8 is inserted into the threads 11 of the first member 10, and the head 2 of the bolt body 1 is rotated by a tool to insert the collar bolt 6 into the female threads 11 of the first member 10. In this state (there is some gap between the outer peripheral surface of the collar bolt and the female threads of the first member), the collar bolt 6 is not subjected to a large resistance, so that torque is smoothly transmitted to the collar bolt 6 from the bolt body 1 and the collar bolt 6 rotates together with the bolt body 1 to advance toward the second member through an inner vacancy defined by thread ridges of the female threads 11 of the first member 10.

Figure 6:
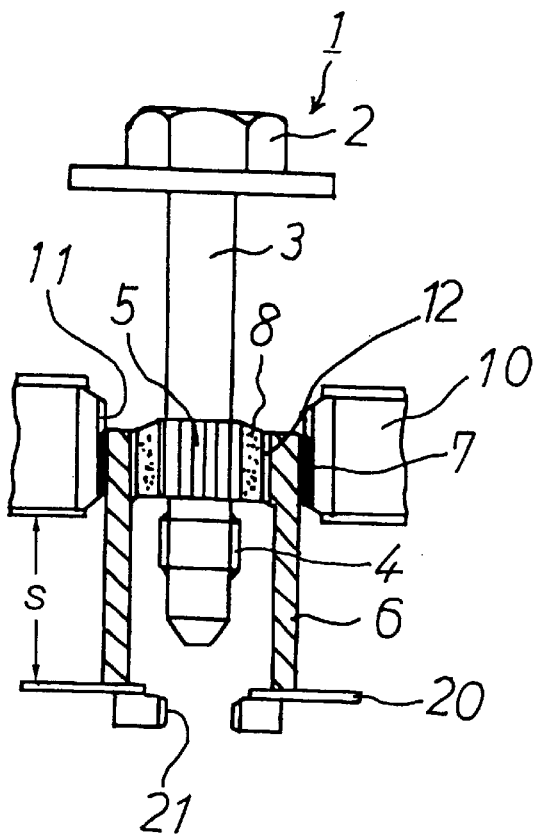

Then male threads 7 provided on the upper portion of the outer peripheral surface of the collar bolt 6 further advance through the inner vacancy while engaging with the female threads 11 of the first member 10 (in this state, such engagement is effected between normal thread ridges, so that an engaging force produced between the resin portion 8 and the lead portion 12 exceeds a frictional force caused by engagement between the thread ridges), and when a lower end of the collar bolt 6 abuts against an upper surface of the second member 20, the collar bolt 6 cannot advance further and so stops at such position (see FIG. 6). In this connection, it is natural that the stop position of the collar bolt 6 varies in accordance with the spacing S between the first member 10 and the second member 20. Differently stated, a height of the collar bolt is determined in accordance with the spacing S.

Figure 7:
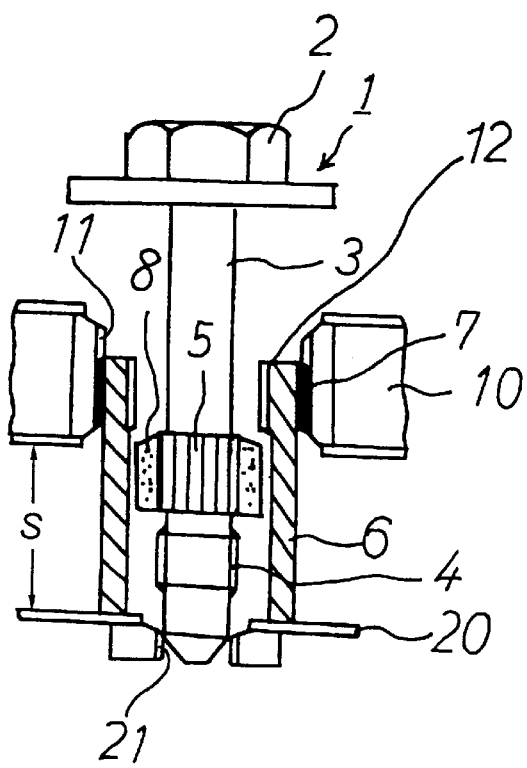

When the bolt body 1 is further rotated from this state, a greater torque than before acts between the collar bolt 6 and the bolt body 1, whereby the engaging relationship between the resin portion 8 and the lead portion 12 is cancelled, and only the bolt body 1 having the resin portion 8 advances to a position where it comes into contact with the second member 20 (see FIG. 7).

When the bolt body 1 is further rotated from this state, the male threads 4 on the bolt body 1 engage with the female threads 21 formed on the second member 20. At this time, even if the central axis 22 of the female threads 11 on the first member 10 and the central axis 23 of the female threads 21 on the second member 20 are positioned offset from each other, the engagement of the male threads 4 on the bolt body 1 with the female threads 21 formed on the second member 20 can be made without any difficulty (in other words, the central axis 23 of the female threads 21 on the second member 20 can be made consistent with the central axis of the bolt body 1) since there is play between the outer peripheral surface of the resin portion 8, which is released from engagement with the lead portion, and the inner peripheral surface of the collar bolt 6.

Figure 8:
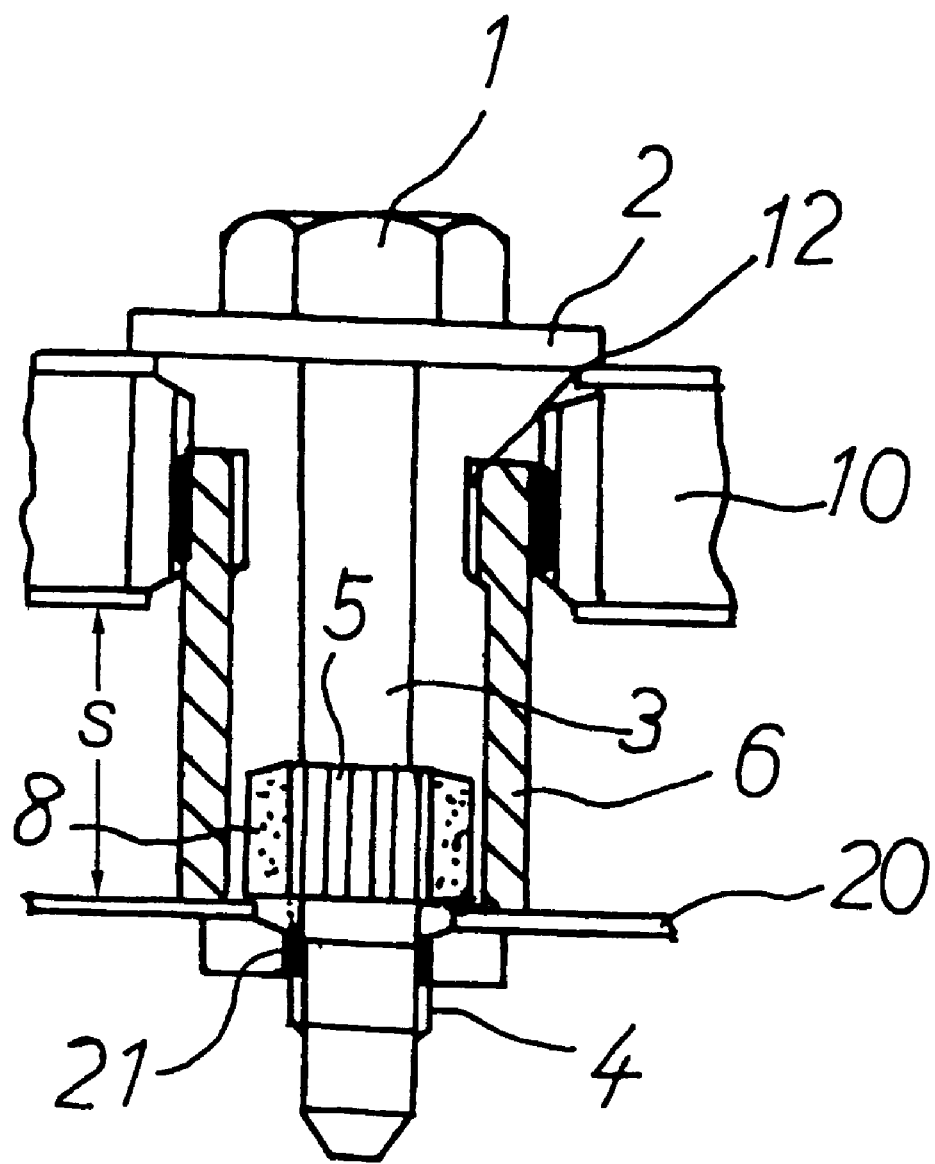
Figure 9:
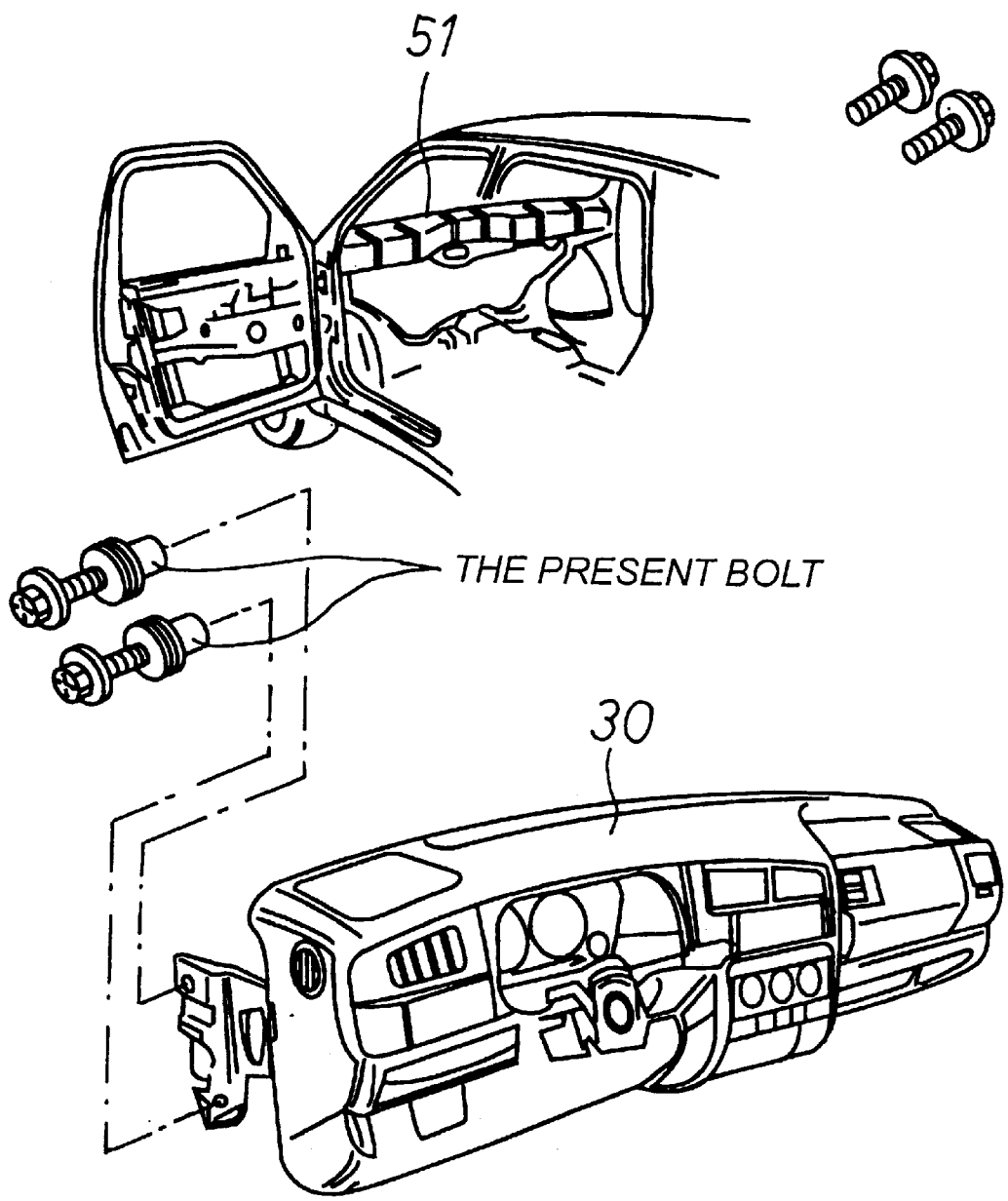
FIG. 9 is a perspective view showing a manner, in which a bolt of the invention is used to mount an instrument panel reinforcement to a car body.
Figure 10:
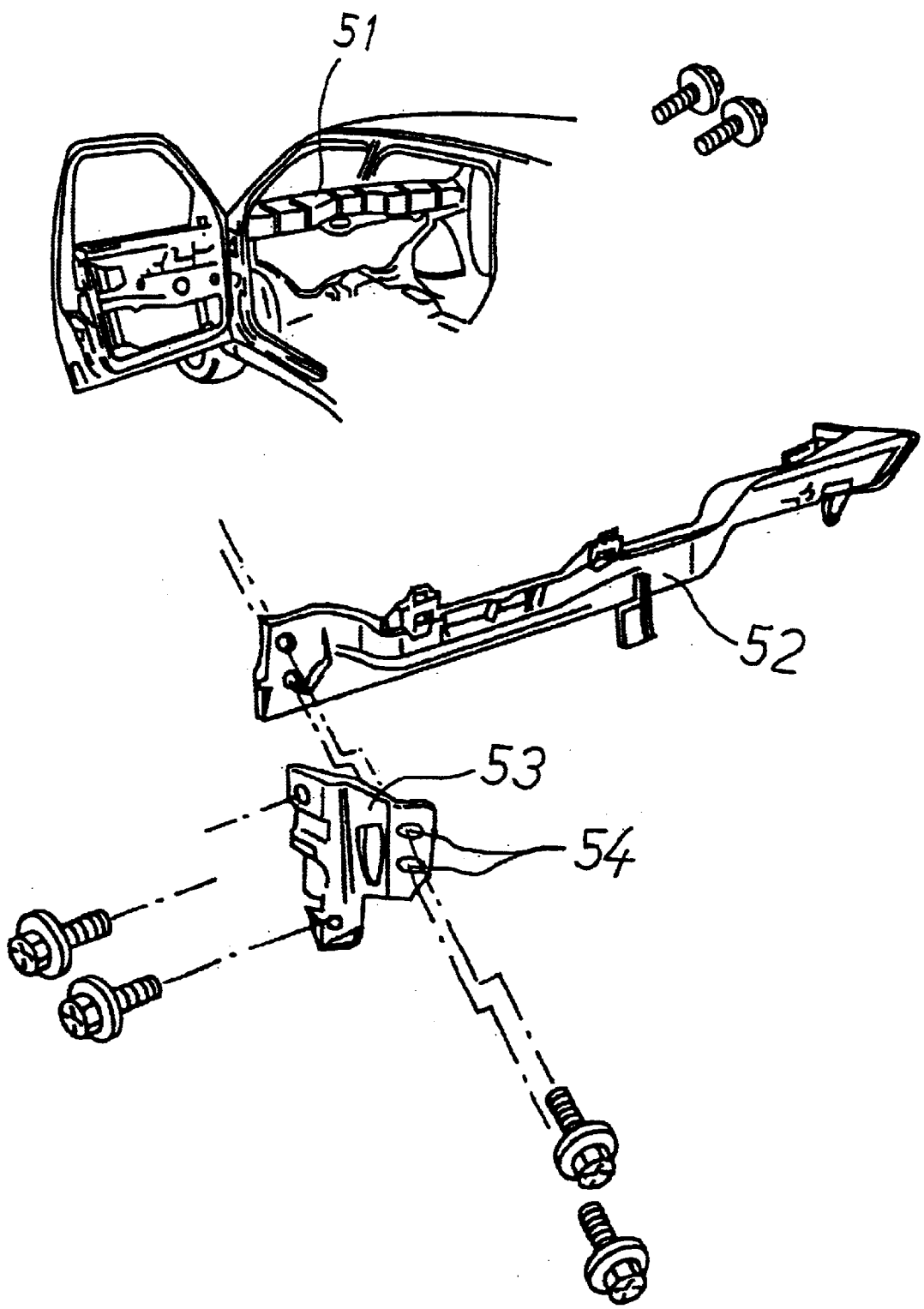
FIG. 10 is a perspective view corresponding to FIG. 9 and showing a prior art technique.

Engagement proceeds between the male threads 4 and the female threads 21, and finally the bolt body 1 is fastened until the underside of the flange of the head pushes the upper surface of the first member 10, thus terminating the fastening operation (see FIG. 8). As shown in the figures, in a state, in which the spacing S between the first member 10 and the second member 20 is kept constant by the collar bolt 6, fastening is surely performed by the bolt body 1.

When the bolt according to the invention is used in this manner, the first member 10 and the second member 20 with a certain spacing S therebetween are fastened together by the bolt body 1 in a state, in which the collar bolt 6 is present therebetween. Since the collar bolt 6 is varied in its stop position in accordance with the spacing S between the first member 10 and the second member 20, possible dispersion in the spacing S can be absorbed, and offset or dislocation in relative positions of the central axis 22 of the female threads 11 and the central axis 23 of the female threads 21 can be absorbed by the existence of play between the collar bolt 6 and the bolt body 1 after release of engagement between the collar bolt 6 and the bolt body 1 during the fastening operation. Therefore, when the spacing S and relative positions of the central axis 22 and the central axis 23 involve dispersion, bolting can be ensured for the first member 10 and the second member 20.

As described above, the bolt according to the invention functions to provide for fastening while absorbing dispersion in relative positions of the first member 10 and the second member 20, so that when it is used in the case of bolting an instrument panel reinforcement or a unit 30 comprised of a module, which includes an instrument panel reinforcement, to the car body 51, the both can be directly bolted to each other without the use of a separate adjustment member as in the prior art.

In this connection, a configuration, in which engagement between the collar bolt 6 and the bolt body 1 is effected through meshing of thread ridges on the resin portion 8 or the collar portion 13 and the lead portion 12, is specifically preferable since engagement and release between the collar bolt 6 and the bolt body 1 can be made smoothly and dismounting of the collar bolt 6 from the bolt body 1 can be made by re-meshing of the resin portion or the collar portion and the lead portion (in this configuration, no thread ridges forming portion is formed at an upper portion of the lead portion 12, on the remainder of which are formed the thread ridges (the female threads)).

INDUSTRIAL APPLICABILITY

As described above, since the bolt according to the invention is provided with a collar bolt, which is capable of absorbing dispersion in relative positions of the first member and the second member, only threading of the bolt body can provide for sure fastening of the first member and the second member and dismounting in some cases. Thus in the case where a member such as an instrument panel reinforcement is mounted on a car body with a certain spacing therebetween, direct bolting can be effected without the use of any adjustment member, and so there is provided an advantage in improving workability in assembly and attaining reduction in cost.

What is claimed is:

1. A fastening position adjustable bolt comprising:
   a bolt body having a head, a shank, and first male threads formed on a lower outer peripheral surface of the shank;
   a cylindrically shaped collar bolt having second male threads formed on an upper outer peripheral surface thereof; and
   an engaging portion which engages the shank of the bolt body with the collar bolt;
   wherein the engaging portion is disposed between the head of the bolt body and a position on the shank at which the first male threads are formed;
   wherein the engaging portion comprises a serration portion formed on the lower outer peripheral surface of the shank and a resin formed between the serration portion and an upper inner peripheral surface of the collar bolt; and
   wherein the engaging portion is adapted to release engagement between the collar bolt and the shank of the bolt body upon application of a torque having at least a predetermined value.

2. A fastening position adjustable bolt according to claim 1, wherein:
   the collar bolt comprises a lead portion with female threads formed on the upper inner peripheral surface of the collar bolt;
   the resin comprises male threads that are engageable with the female threads of the collar bolt, and
   a part of thread ridges of the female threads has a pitch that is different from a pitch of a remainder of the thread ridges or is compressed at crests thereof in a diameter reducing direction.

3. A mount construction that utilizes a fastening position adjustable bolt according to claim 2 to fasten a first member to a second member at a predetermined distance,
   wherein the first member comprises a first hole with first female threads formed on an inner peripheral surface thereof;
   wherein the second member comprises a second hole with second female threads formed on an inner peripheral surface thereof;
   wherein the second male threads formed on the upper outer peripheral surface of the collar bolt are engageable with the first female threads of the first hole of the first member, and the first male threads formed on the lower outer peripheral surface of the shank are engageable with the second female threads of the second hole of the second member; and
   wherein a gap is formed between an outer peripheral surface of the resin and the inner peripheral surface of the collar bolt.

4. The mount construction according to claim 3, wherein the first member comprises a body of a motorcar, and the second member comprises one of an instrument panel reinforcement and a module which includes the instrument panel reinforcement.

5. A mount construction that utilizes a fastening position adjustable bolt according to claim 1 to fasten a first member to a second member at a predetermined distance,
   wherein the first member comprises a first hole with first female threads formed on an inner peripheral surface thereof;
   wherein the second member comprises a second hole with second female threads formed on an inner peripheral surface thereof;
   wherein the second male threads formed on the upper outer peripheral surface of the collar bolt are engageable with the first female threads of the first hole of the first member, and the first male threads formed on the lower outer peripheral surface of the shank are engageable with the second female threads of the second hole of the second member; and
   wherein a gap is formed between an outer peripheral surface of the resin and the inner peripheral surface of the collar bolt.

6. The mount construction according to claim 5, wherein the first member comprises a body of a motorcar, and the second member comprises one of an instrument panel reinforcement and a module which includes the instrument panel reinforcement.

7. A fastening position adjustable bolt comprising:
   a bolt body having a head, a shank, and first male threads formed on a lower outer peripheral surface of the shank;
   a cylindrically shaped collar bolt having second male threads formed on an upper outer peripheral surface thereof; and
   an engaging portion which engages the shank of the bolt body with the collar bolt;
   wherein the engaging portion is disposed between the head of the bolt body and a position on the shank at which the first male threads are formed;
   wherein the engaging portion comprises a collar portion provided on the shank;
   wherein the collar bolt comprises a lead portion with female threads formed on the upper inner peripheral surface of the collar bolt;

wherein the collar portion has male threads formed on an outer peripheral surface thereof;

wherein the female threads of the lead portion of the collar bolt are engageable with the male threads of the collar portion;

wherein a part of thread ridges of either the female threads of the lead portion of the collar bolt or the male threads of the collar portion has a pitch that is different a pitch of a remainder of the thread ridges or is compressed at crests thereof in a diameter reducing direction; and wherein the engaging portion is adapted to release engagement between the collar bolt and the shank of the bolt body upon application of a torque having at least a predetermined value.

8. A mount construction that utilizes a fastening position adjustable bolt according to claim 7 to fasten a first member to a second member at a predetermined distance, wherein the first member comprises a first hole with first female threads formed on an inner peripheral surface thereof;

wherein the second member comprises a second hole with second female threads formed on an inner peripheral surface thereof;

wherein the second male threads formed on the upper outer peripheral surface of the collar bolt are engageable with the first female threads of the first hole of the first member, and the first male threads formed on the lower outer peripheral surface of the shank are engageable with the second female threads of the second hole of the second member; and wherein a gap is formed between an outer peripheral surface of the collar portion and the inner peripheral surface of the collar bolt.

9. The mount construction according to claim 8, wherein the first member comprises a body of a motorcar, and the second member comprises one of an instrument panel reinforcement and a module which includes the instrument panel reinforcement.

10. A fastening position adjustable bolt comprising:

a bolt body having a head, a shank, and first male threads formed on a lower outer peripheral surface of the shank;

a cylindrically shaped collar bolt having second male threads formed on an upper outer peripheral surface thereof; and an engaging portion which engages the shank of the bolt body with the collar bolt;

wherein the engaging portion is disposed between the head of the bolt body and a position on the shank at which the first male threads are formed;

wherein the engaging portion comprises a serration portion formed on the lower outer peripheral surface of the shank;

wherein the collar bolt comprises a lid member formed at an upper surface of the collar bolt, and the lid member has a hole formed centrally therein with a diameter smaller than a diameter of the serration portion;

wherein the serration portion is adapted to be press fitted into the hole of the lid of the collar bolt to effect engagement between the collar bolt and the shank of the both body; and wherein the engaging portion is adapted to release the engagement between the collar bolt and the shank of the bolt body upon application of a torque having at least a predetermined value.

11. A mount construction that utilizes a fastening position adjustable bolt according to claim 10 to fasten a first member to a second member at a predetermined distance, wherein the first member comprises a first hole with first female threads formed on an inner peripheral surface thereof;

wherein the second member comprises a second hole with second female threads formed on an inner peripheral surface thereof;

wherein the second male threads formed on the upper outer peripheral surface of the collar bolt are engageable with the first female threads of the first hole of the first member, and the first male threads formed on the lower outer peripheral surface of the shank are engaqeable with the second female threads of the second hole of the second member; and wherein a gap is formed between an outer peripheral surface of the serration portion and the inner peripheral surface of the collar bolt.

12. The mount construction according to claim 11, wherein the first member comprises a body of a motorcar, and the second member comprises one of an instrument panel reinforcement and a module which includes the instrument panel reinforcement.

* * * * *